(12) United States Patent
Donzis et al.

(10) Patent No.: US 11,711,417 B2
(45) Date of Patent: *Jul. 25, 2023

(54) METHOD AND SYSTEM FOR PROVIDING WATERMARK TO SUBSCRIBERS

(71) Applicant: PERFTECH, INC., San Antonio, TX (US)

(72) Inventors: Lewis T. Donzis, San Antonio, TX (US); Henry M. Donzis, San Antonio, TX (US); Peter W. Baron, San Antonio, TX (US); John A. Murphy, San Antonio, TX (US)

(73) Assignee: PERFTECH, INC., San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/229,807

(22) Filed: Apr. 13, 2021

(65) Prior Publication Data

US 2021/0234915 A1 Jul. 29, 2021

Related U.S. Application Data

(63) Continuation of application No. 16/794,132, filed on Feb. 18, 2020, now Pat. No. 10,979,484, which is a continuation of application No. 15/442,391, filed on Feb. 24, 2017, now Pat. No. 10,567,470, which is a continuation of application No. 14/672,923, filed on Mar. 30, 2015, now Pat. No. 9,584,581, which is a continuation of application No. 13/936,875, filed on Jul. 8, 2013, now Pat. No. 9,002,989, which is a (Continued)

(51) Int. Cl.
*H04L 67/306* (2022.01)
*H04L 67/563* (2022.01)
*H04L 67/02* (2022.01)
*H04N 1/00* (2006.01)
*H04N 1/32* (2006.01)

(52) U.S. Cl.
CPC ............ *H04L 67/02* (2013.01); *H04L 67/306* (2013.01); *H04L 67/563* (2022.05); *H04N 1/00209* (2013.01); *H04N 1/00217* (2013.01); *H04N 1/00244* (2013.01); *H04N 1/00344* (2013.01); *H04N 1/00464* (2013.01); *H04N 1/32144* (2013.01); *H04N 1/32352* (2013.01); *H04N 2201/3233* (2013.01); *H04N 2201/3249* (2013.01)

(58) Field of Classification Search
None
See application file for complete search history.

(56) References Cited

U.S. PATENT DOCUMENTS 6,148,333 A 11/2000 Guedalia et al.
6,311,185 B1 10/2001 Markowitz et al.
6,567,843 B1 5/2003 Schumacher
(Continued)

*Primary Examiner* — Joshua Joo

(57) ABSTRACT

A method for providing watermark to subscribers is provided. The method comprises observing a request for a first content from a subscriber, determining if the subscriber can receive a watermark, generating a second content comprising the watermark if the subscriber can receive a watermark, causing the subscriber to fetch the first content, and causing the subscriber to fetch the second content comprising the watermark overlaying the first content.

16 Claims, 5 Drawing Sheets

Related U.S. Application Data continuation of application No. 12/340,836, filed on Dec. 22, 2008, now Pat. No. 8,489,770.

(60) Provisional application No. 61/027,209, filed on Feb. 8, 2008.

(56) References Cited

U.S. PATENT DOCUMENTS

| | | | |
|---|---|---|---|
| 6,636,247 B1 | 10/2003 | Hamzy et al. | |
| 6,704,797 B1 | 3/2004 | Fields et al. | |
| 7,295,677 B2 | 11/2007 | Simpson et al. | |
| 7,328,266 B2 * | 2/2008 | Schmidt | H04L 67/564 709/227 |
| 7,559,034 B1 | 7/2009 | Papemy et al. | |
| 7,747,619 B2 | 6/2010 | Gorodyansky et al. | |
| 7,975,020 B1 | 7/2011 | Green et al. | |
| 7,987,194 B1 | 7/2011 | Walker et al. | |
| 8,543,098 B2 | 9/2013 | Tischer et al. | |
| 8,578,264 B2 | 11/2013 | Chen et al. | |
| 8,656,449 B1 * | 2/2014 | Breau | H04L 67/322 726/1 |
| 2002/0066033 A1 * | 5/2002 | Dobbins | H04L 67/02 726/4 |
| 2002/0112033 A1 | 8/2002 | Doemling et al. | |
| 2003/0115354 A1 * | 6/2003 | Schmidt | H04L 67/564 709/232 |
| 2003/0128234 A1 | 7/2003 | Brown et al. | |
| 2004/0024848 A1 | 2/2004 | Smith et al. | |
| 2004/0064416 A1 * | 4/2004 | Peled | H04N 21/8456 707/E17.116 |
| 2004/0083382 A1 * | 4/2004 | Markham | H04L 63/20 726/1 |
| 2006/0004630 A1 | 1/2006 | Griddle et al. | |
| 2006/0123183 A1 | 6/2006 | Koivisto et al. | |
| 2006/0206380 A1 | 9/2006 | Joo | |
| 2006/0293962 A1 | 12/2006 | Malobrodsky et al. | |
| 2007/0156659 A1 | 7/2007 | Lim | |
| 2007/0180147 A1 | 8/2007 | Leigh | |
| 2007/0266091 A1 | 11/2007 | Lin et al. | |
| 2008/0209318 A1 | 8/2008 | Allsop et al. | |
| 2008/0228938 A1 * | 9/2008 | Plamondon | H04L 67/02 709/233 |
| 2008/0285565 A1 | 11/2008 | Gunther | |
| 2009/0122798 A1 * | 5/2009 | Iwai | H04L 63/08 726/4 |
| 2009/0182843 A1 | 7/2009 | Hluchyj et al. | |
| 2011/0015975 A1 | 1/2011 | Yruski et al. | |
| 2011/0055259 A1 | 3/2011 | Brindley | |
| 2011/0184787 A1 | 7/2011 | Morrison et al. | |
| 2014/0095312 A1 | 4/2014 | Lynn | |
| 2014/0304762 A1 | 10/2014 | Puri | |
| 2014/0365563 A1 | 12/2014 | Raghu et al. | |
| 2015/0379246 A1 * | 12/2015 | Aime | H04L 63/1483 726/23 |
| 2017/0323307 A1 | 11/2017 | Teinila et al. | |
| 2019/0260727 A1 | 8/2019 | Mukerji et al. | |
| 2020/0380534 A1 * | 12/2020 | Gorti | G06Q 30/0222 |

* cited by examiner

METHOD AND SYSTEM FOR PROVIDING WATERMARK TO SUBSCRIBERS

FIELD OF THE INVENTION

The present disclosure relates to watermark. In particular, the present disclosure relates to providing watermark through an Internet Service Provider (ISP) or a proxy server to subscribers.

BACKGROUND OF THE INVENTION

A digital watermark is a message which is embedded into digital content that can be detected. For example, a watermark may be embedded in an image or text message, such as an advertising logo. The watermarked image is then added to a Webpage by modifying the underlying HTML or cascade style sheet. The Webpage comprising the watermarked image is then uploaded to a Web server where it is stored and later rendered to subscribers upon request.

While Webpage comprising watermarked image can be provided to subscribers of an Internet service, the current state of the art does not distinguish between subscribers who are supposed to receive watermarked image and those who are not. In addition, the current state of the art does not dynamically generate the watermarked image upon request of the Webpage by subscribers. Instead, most watermark images are pre-generated by the Web server. Therefore, what is needed is a method and system for providing watermark to subscribers of an Internet service dynamically and only to subscribers who are supposed to receive the watermark.

SUMMARY OF THE INVENTION

In one embodiment of the present invention, a method for providing watermark to subscribers is provided. The method comprises receiving a request for a first content from a subscriber, determining if the subscriber can receive a watermark, generating a second content comprising the watermark overlaying the first content if the subscriber can receive a watermark, and causing the subscriber to fetch the second content.

In an alternative embodiment, the method comprises receiving a request for a first content from a subscriber, connecting to a destination server comprising the first content, retrieving the first content from the destination server, adding a watermark to the first content to form a second content, and causing the subscriber to fetch the second content.

A system for providing watermark to subscribers is also provided. In one embodiment, the system comprises a data processing system utilized by a subscriber of Internet service, the data processing system comprises a Web browser for initiating a request for a first content, a destination server communicably coupled to Internet service provider via Internet, the destination server comprises the first content, and an Internet service provider comprising a consolidating and management device, a router, and a redirecting device, the Internet service provider communicably coupled to the data processing system and the destination server.

In an alternative embodiment, the system comprises a data processing system utilized by a subscriber of Internet service, the data processing system comprises a Web browser for initiating a request for a Webpage, a destination server communicably coupled to Internet service provider via Internet, the destination server comprises the Webpage, and a proxy server communicably coupled to the data processing system and the destination server, the proxy server comprising a composite Webpage comprising a watermark and the Webpage.

DETAILED DESCRIPTION OF THE INVENTION

In the Applicant's earlier patent applications, the entire contents of which are explicitly incorporated herein by reference, the present Applicants described networks in which communications could be provided from an ISP to a subscriber of the ISP. In the referenced applications, a redirection device was placed in the path of upstream traffic from the subscriber. The redirection device, operating under the control of a consolidating and management device elsewhere in the network, processed upstream data packets to determine when targeted communications to the subscriber were required. The present embodiments utilize many of the features and functionalities of the networks described in the Applicant's earlier patent applications referenced above.

Figure 1:
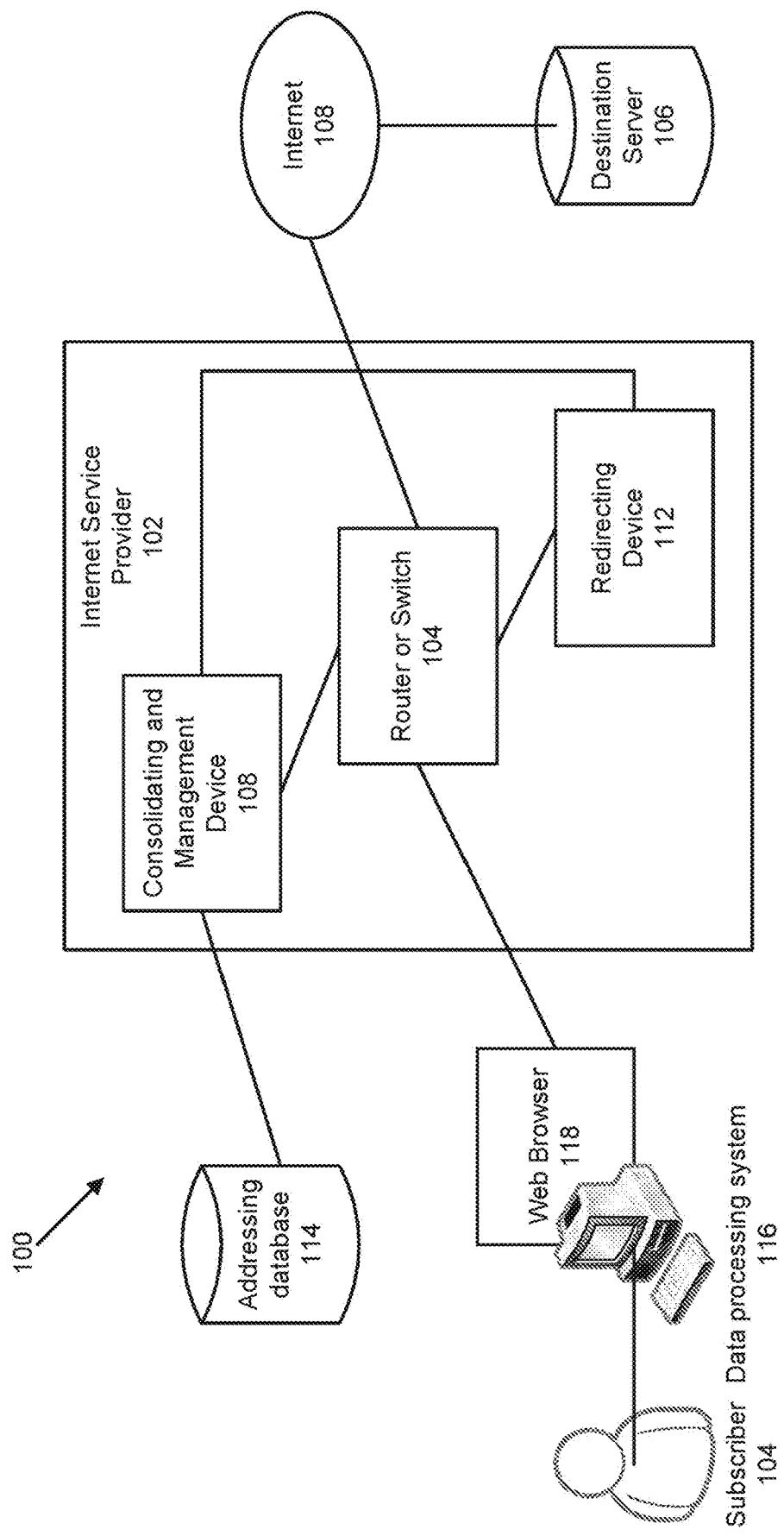
FIG. 1 depicts a system for providing watermark to subscribers in accordance with one embodiment of the disclosure.

Referring to FIG. 1, a system for providing watermark to subscribers in accordance with one embodiment of the disclosure in which a subscriber receives a watermark. In system 100, Internet service provider (ISP) 102 provides Internet access to subscriber 102. In one embodiment, Internet service provider 102 comprises a router or switch 104 for routing requests from subscriber 104 upstream, for example, to destination server 106 via the Internet 108 or downstream from destination server 106 to subscriber 104.

In accordance with the present disclosure, a bulletin service is provided to survey the state of the upstream and downstream network and automatically provide high visibility of the status of the subscriber 104. The bulletin service may deliver individual content, such as watermark images, to specified subscribers 104 or groups of subscribers with individually tailored policies, such as watermark delivery policy. The bulletin service may also target subscribers issuing packets with requests for Web pages and examines watermark delivery policy of the subscribers 104 before providing watermarked Webpage to the subscribers 104.

Internet service provider 102 also comprises a consolidation and management device 108 for providing data services and management control to the deployed redirecting devices 112. This device will be interconnected to a network, such as an Internet Protocol network, which interconnects all of the destination servers 106 as well as the Internet portal. Consolidation and management device 108 is communicably coupled to an addressing database 114, which stores information about subscribers 104, including subscribers' Internet protocol (IP) addresses and user specific policies, such as watermark delivery policies.

Internet service provider 102 further comprises redirecting device 112, which provides intelligence at the last scalable point in the IP network relative to the subscriber 104. This device may be located anywhere in the system where access to subscriber's upstream traffic is available. In one embodiment, redirecting device 112 receives upstream traffic from subscriber 104 that is sent from data processing system 116. Data processing system 116 may be a laptop computer, a desktop computer, or other types of devices capable of sending and receiving data via a wired or wireless protocol. Data processing system 116 may comprise a Web browser 118 for displaying Web pages upon sending and receiving requests from subscriber 104.

Upon receiving upstream traffic, redirecting device 112 examines the traffic to determine if subscriber 104 is supposed to receive watermark and issue a watermarked Webpage to the subscriber if Web browser 118 accepts instructions of the watermarked Webpage. It is noted that the transfer of information between the router or switch 104 and the destination server may be made using an Internet protocol (IP). In addition, the transfer of information between router or switch 104, addressing database 114, data processing system 116, consolidation and management device 108, redirecting device 112 occurs via at least one of a wireless protocol, a wired protocol or the combination of the wireless protocol and the wired protocol. The steps performed in this figure are performed by software, hardware, firmware, and/or the combination of software, hardware, and/or firmware.

Figure 2:
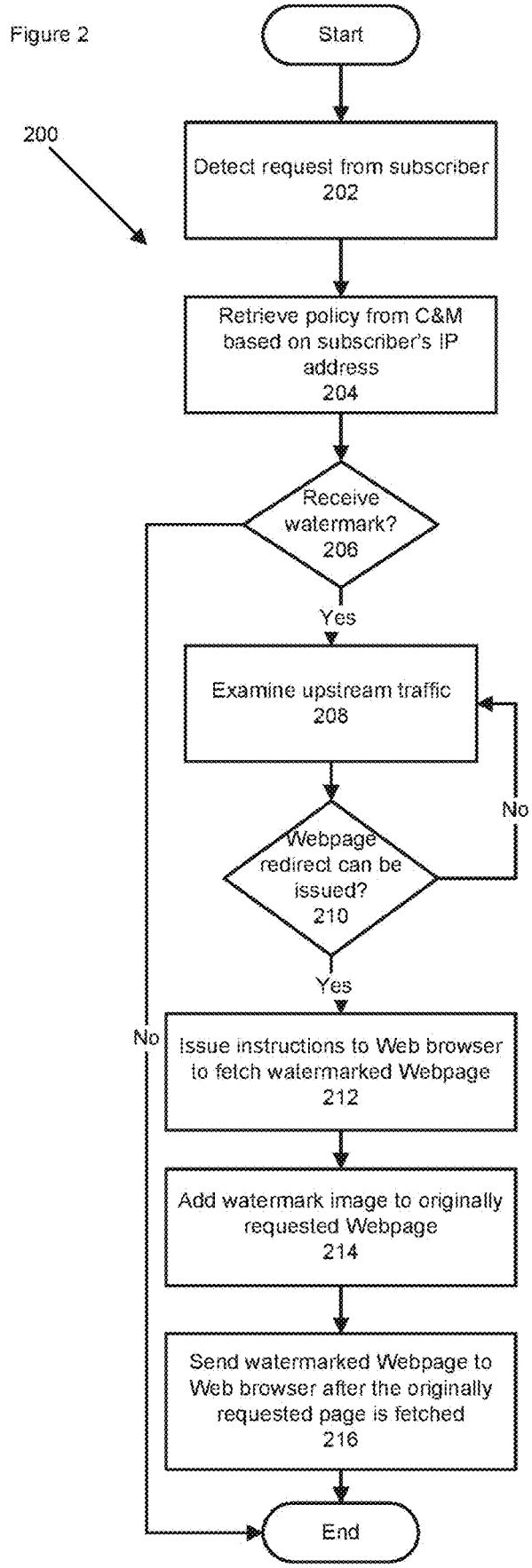
FIG. 2 depicts a flowchart of a process for providing watermark to subscribers in accordance with one embodiment of the disclosure.

Referring to FIG. 2, a flowchart of a process for providing watermark to subscribers is depicted in accordance with one embodiment of the present disclosure. Process 200 may be implemented as computer instructions embodied in a computer readable medium that may be executed within redirecting device 112. Process 200 begins at step 202 to detect a request for content, such as a Webpage, from a subscriber. The request for content may be sent by subscriber 104 from Web browser 118 in the data processing system 116.

Upon detecting the request, process 200 continues to step 204 to retrieve watermark delivery policy from the consolidated and management device. In one embodiment, the watermark delivery policy of a subscriber may be retrieved based on the subscriber's Internet protocol address. The consolidated and management device may retrieve the associated watermark delivery policy based on the IP address of the subscriber from the addressing database. The watermark delivery policy may be defined for a subscriber or a group of subscribers.

After the policy is retrieved, process 200 continues to step 206 to determine if the subscriber can receive watermark based on the watermark delivery policy. If the subscriber cannot receive watermark based on the policy, process 200 terminates. If the subscriber can receive watermark based on the policy, process 200 continues to step 208 to examine the subscriber's upstream traffic. In this step, the router or switch passes selected upstream traffic to the redirecting device for examination. Process 200 then continues to step 210 to determine if Webpage redirect can be issued to the subscriber's Web browser. If Webpage redirect cannot be issued to the subscriber's Web browser, process 200 returns to step 208 to continue examining more upstream traffic. If the Webpage redirect can be issued to the Web browser, process 200 continues to step 212 to issue instructions to the subscriber's Web browser to fetch a watermarked Webpage.

Process 200 then continues to step 214 to add watermark image to the originally requested Webpage. In one embodiment, the originally requested Webpage is retrieved from the destination server. The originally requested Webpage may be provided in one frame while the watermark image may be provided in another frame. A watermarked Webpage is then formed by overlaying the watermark image frame over the Webpage frame on the Z-axis. In an alternative embodiment, the watermark image may be provided in the same frame as the original requested Webpage. Process 200 then completes at step 216 to send the watermarked Webpage to the subscriber's Web browser for display. In one embodiment, the watermarked Webpage is fetched by the subscriber after the originally requested Webpage is fetched.

The watermark image overlaid may be a text or graphic object having a specifiable transparency. In that case, the originally requested Webpage may be viewed through the watermark image. In addition, the watermark image may include an embedded hyperlink which directs the subscriber to another Webpage upon clicking on the hyperlink.

Figure 3:
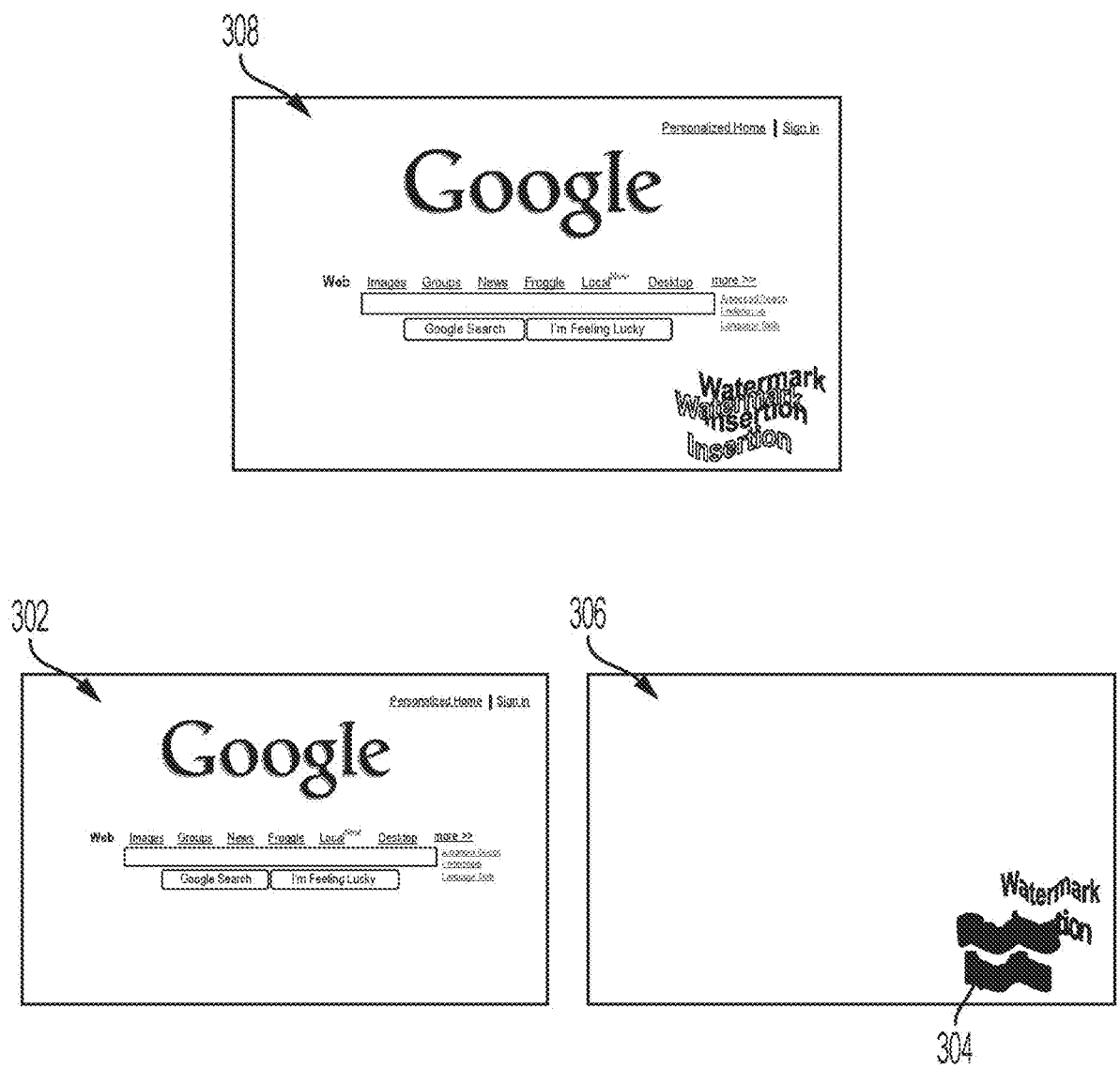
FIG. 3 depicts a diagram illustrating an exemplary watermarked Webpage provided by the redirecting device in accordance with one embodiment of the present disclosure.

Referring to FIG. 3, a diagram illustrating an exemplary watermarked Webpage provided by the redirecting device is depicted in accordance with one embodiment of the present disclosure. In this exemplary implementation, Webpage 302 is a Web page that is originally requested by the subscriber. In this example, the originally requested Webpage 302 is a search engine main page from google.com. After the redirecting device determines that the subscriber may receive watermark and that the Web browser may receive Webpage redirect instructions, the redirecting device adds a watermark image 304 to the originally requested Webpage 302. In this example, the watermark image 304 is provided in a frame 306 different from the originally requested Webpage 304.

One aspect of the present disclosure provides the ability to merge two frames into one browser image page to form a watermarked Webpage. In this example, the watermark image frame 206 is overlaid on top of the frame of the originally requested Webpage 302. Because a transparency may be specified for the watermark image 304, the resulting watermarked Webpage 308 comprises the requested Webpage 302 that can be viewed through the watermark image 304. In addition, the watermark image 304 may include a hyperlink that redirects the subscriber to a different Webpage if the subscriber clicks on the image. Alternatively, the hyperlink contained within watermark image 304 be displayed in a manner that takes precedent over other hyperlinks that are displayed in the originally requested Webpage 302. Furthermore, the watermark image 304 may be displayed at any part of the frame. For example, instead of the lower right portion of the watermarked Webpage 308, the watermark image 304 may be displayed at the top left portion of the watermarked Webpage 308. The watermark image 304 stays on the same part of the frame, for example, lower right corner but could be in any other location, even if the subscriber scrolls or maneuvers in different portions of the frame. In yet another alternative embodiment, the watermark image 304 may be added to the originally requested Webpage 302 such that the subscriber must click on the watermark image 304 before the originally requested Webpage 302 becomes active in the watermarked Webpage 308.

Figure 4:
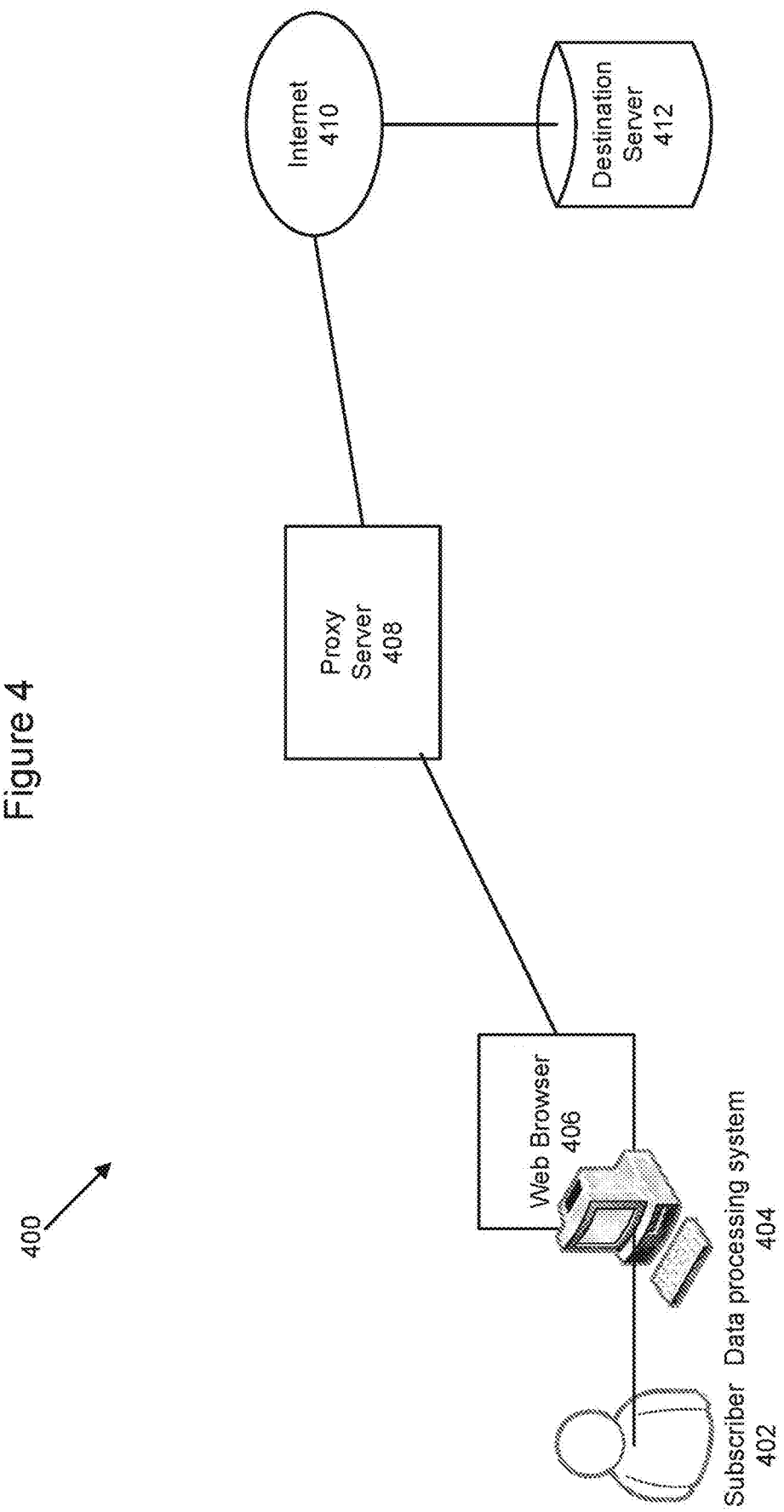
FIG. 4 depicts a diagram of a system for providing watermark to subscribers in accordance with an alternative embodiment of the present disclosure.

In addition to providing watermark by an Internet service provider, the present disclosure also provides watermark to subscribers via a proxy server. Referring to FIG. 4, a diagram of a system for providing watermark to subscribers is depicted in accordance with an alternative embodiment of the present disclosure. System 400 comprises a proxy server 408, which dynamically builds a composite Webpage that comprises the originally requested Webpage and the watermark image.

The subscriber 402 may initiate a request for a Webpage in a Web browser 406 of data processing system 404. Upon receiving the request, the proxy server 408 makes a connection with a destination server 412, in which the requested Webpage is stored, via the Internet 410. The connection may be made via an Internet protocol. The proxy server 408 then retrieves the requested Webpage from the destination server 412 and dynamically builds a composite Webpage with the watermark image. The composite watermarked Webpage is then sent from the proxy server 408 to the Web browser 406 for display to the subscriber 402.

Figure 5:
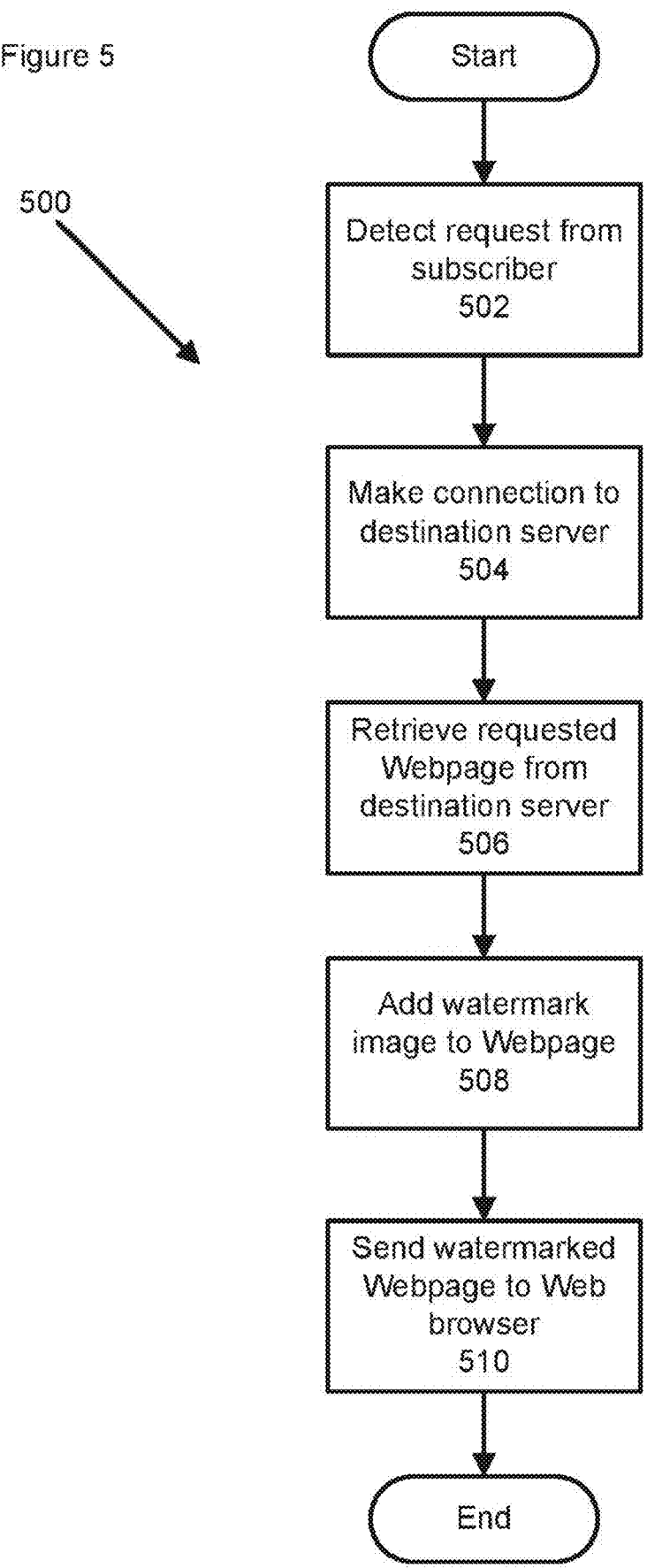
FIG. 5 depicts a flowchart of a process for providing watermark to subscribers in accordance with an alternative embodiment of the present disclosure.

Referring to FIG. 5, a flowchart of a process for providing watermark to subscribers is depicted in accordance with an alternative embodiment of the present disclosure. Process 500 may be implemented as computer instructions embodied in a computer readable medium that may be executed within a proxy server 408. Process 500 begins at step 502 to detect a request for a Webpage from the subscriber. In one embodiment, the request for a Webpage may be sent by the subscriber via a Web browser in a data processing system.

Process 500 then continues to step 504 to make a connection with the destination server, where the requested Webpage is stored. In one embodiment, the connection may be made using an Internet protocol. Process 500 then continues to retrieve the requested Webpage from the destination server upon making a connection. Process 500 continues to step 508 to add a watermark image to the Webpage retrieved from the destination server. In one embodiment, adding the watermark image comprises overlying one frame comprising the watermark image over another frame comprising the retrieved Webpage in the Z-axis. Alternatively, a composite Webpage may be built by merging the watermark image and the retrieved Webpage into a single frame. Once the watermark image is added, process 500 completes at step 510 to send the watermarked Webpage to the Web browser for display to the subscriber. Thus, instead of sending the originally requested page to the subscriber, the proxy server adds the watermark image to the originally requested page by building a composite Webpage with overlaid frames. The proxy server then substitutes the originally requested page with the composite Webpage before sending and displaying it to the subscriber.

In summary, the present disclosure a method and system for providing watermark to subscribers. In one embodiment, a redirecting server is provided which examines upstream traffic from the subscriber and determines if the subscriber can receive watermark based on a policy. If the subscriber can receive watermark based on the policy, the redirecting server causes the subscriber to retrieve the requested Webpage from the destination server after first retrieving the watermark image which, after causing the subscriber to retrieve the requested Webpage overlays the watermarked image on the requested page to form a watermarked Webpage. In an alternative embodiment, a proxy server is provided to receive request for a Webpage from the subscriber. Upon receiving the request, the proxy server retrieves the requested Webpage from the destination server and builds a composite Webpage comprising the requested webpage and the watermark image. The composite Webpage may be built by overlaying one frame having the watermark image over another frame having the requested Webpage. While a single ISP and proxy server has been described and illustrated, a person of ordinary skilled in the art will readily understand that a plurality of ISPs and proxy servers may be provided. In addition to ISPs and proxy servers, aspects of the present disclosure may be implemented in other types of servers that are communicably coupled between the subscriber and the destination server without departing the spirit and scope of the present disclosure.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method, comprising:
retrieving an originally requested webpage comprising content;
generating additional content comprising a watermark based on a watermark delivery policy identifying a subscriber device and retrieved from a management device and when it is determined that a webpage redirect is permissible for the subscriber device;
overlaying the additional content comprising the watermark from a first frame over the content of the originally requested webpage as a second frame to create a composite webpage; and
loading the composite webpage including webpage content with the watermark on a web browser of the subscriber device.

2. The method of claim 1, comprising determining that a webpage redirect can be issued for the web browser of the subscriber device.

3. The method of claim 1, wherein the watermark is transparent.

4. The method of claim 1, wherein the originally requested webpage comprising the content is displayed through the watermark.

5. The method of claim 1, wherein the watermark comprises a hyperlink redirecting the subscriber to another content upon the subscriber device clicking on the hyperlink.

6. The method of claim 1, wherein the watermark is positioned at a portion of the additional content comprising the watermark, wherein the portion is one of a top, bottom, left, right, and center portion.

7. The method of claim 1, wherein the watermark remains in a same position between the originally requested webpage comprising the content and the additional content comprising the watermark.

8. The method of claim 1, wherein the originally requested webpage comprising the content becomes active in the additional content comprising the watermark upon the subscriber device clicking on the watermark.

9. A method, comprising:
- retrieving first content from a destination server, the first content comprising an originally requested webpage in a first frame when it is determined that a webpage redirect can be issued to a subscriber's web browser of a subscriber device responsive to a request for the originally requested webpage;
- overlaying a watermark stored in a second frame as a second content over the first content to form a composite webpage based on a watermark delivery policy identifying the subscriber device and retrieved from a management device; and
- loading the composite webpage including the webpage content with the watermark on the web browser of the subscriber device.

10. The method of claim 9, wherein overlaying the watermark stored in the second frame as the second content over the first content to form the composite webpage occurs prior to providing the composite webpage to the web browser of the subscriber device.

11. The method of claim 9, comprising connecting to the destination server via an Internet Protocol-based connection.

12. The method of claim 9, comprising generating the second content comprising the watermark in the second frame.

13. The method of claim 12, comprising generating the second content if the subscriber device can receive the watermark.

14. The method of claim 9, comprising sending the second content to the subscriber device.

15. A system, comprising:
- a proxy server comprising a processor and memory, and wherein the processor executes instructions which:
- retrieve a first content comprising an originally requested webpage in a first frame when it is determined a webpage redirect can be issued to a web browser of a subscriber device;
- generate additional content comprising a watermark based on a watermark delivery policy identifying the subscriber device;
- overlay the watermark stored in a second frame as a second content over the first content to form the composite webpage; and
- load the composite webpage including the webpage with the watermark on a web browser of the subscriber device.

16. The system of claim 15, wherein the watermark comprises a hyperlink redirecting the subscriber device to another content upon the subscriber clicking on the hyperlink.

* * * * *